United States Patent
Esbelin

(10) Patent No.: US 11,142,917 B2
(45) Date of Patent: Oct. 12, 2021

(54) RIGID PANEL FOR MAKING A FLOOR COVERING

(71) Applicant: GERFLOR, Villeurbanne (FR)

(72) Inventor: Christian Esbelin, Bollene (FR)

(73) Assignee: GERFLOR, Villeurbanne (FR)

(*) Notice: Subject to any disclaimer, the term of this patent is extended or adjusted under 35 U.S.C. 154(b) by 0 days.

(21) Appl. No.: 16/188,353

(22) Filed: Nov. 13, 2018

(65) Prior Publication Data

US 2019/0145109 A1    May 16, 2019

(30) Foreign Application Priority Data

Nov. 13, 2017   (FR) ...................... 1760628

(51) Int. Cl.
| | |
|---|---|
| *B32B 27/08* | (2006.01) |
| *E04F 15/10* | (2006.01) |
| *B32B 27/30* | (2006.01) |
| *B32B 27/22* | (2006.01) |
| *B32B 27/20* | (2006.01) |

(Continued)

(52) U.S. Cl.
CPC .............. *E04F 15/107* (2013.01); *B32B 7/12* (2013.01); *B32B 27/08* (2013.01); *B32B 27/20* (2013.01); *B32B 27/22* (2013.01); *B32B 27/304* (2013.01); *E04F 15/105* (2013.01); *E04F 15/225* (2013.01); *B32B 2264/0221* (2013.01); *B32B 2307/412* (2013.01); *B32B 2307/536* (2013.01); *B32B 2307/54* (2013.01);

(Continued)

(58) Field of Classification Search
CPC ........ E04F 15/107; E04F 15/105; B32B 7/12; B32B 27/08; B32B 27/20; B32B 27/22; B32B 27/304; B32B 2264/0221; B32B 2307/412; B32B 2307/536; B32B 2307/54; B32B 2307/554; B32B 2307/732; B32B 2471/00

See application file for complete search history.

(56) References Cited

U.S. PATENT DOCUMENTS

2011/0305886 A1* 12/2011 Phan ................... B32B 9/045
                                                                            428/201
2012/0276348 A1* 11/2012 Clausi ................ B32B 29/002
                                                                            428/196

(Continued)

FOREIGN PATENT DOCUMENTS

| EP | 1026341 | 8/2000 |
|---|---|---|
| EP | 2843153 | 3/2015 |

(Continued)

OTHER PUBLICATIONS

ASTM_F_1066_Vinyl_Composition_Floor_Tile (Year: 2018).*
Search Report dated Jun. 12, 2018, from related application No. FR 1760628, 8 pages.

*Primary Examiner* — Travis M Figg
(74) *Attorney, Agent, or Firm* — Meunier Carlin & Curfman LLC

(57) ABSTRACT

The disclosure relates to a multilayer panel for producing a floor covering, comprising a wear layer bonded to a back layer, said back layer being made up of at least a thermoplastic material, a plasticizer and fillers, the wear layer comprising a surface layer made up at least of PVC, said surface layer having a Shore D hardness greater than or equal to 60 and a Young's modulus greater than or equal to 1000 MPa.

20 Claims, 2 Drawing Sheets

(51) Int. Cl.
*B32B 7/12* (2006.01)
*E04F 15/22* (2006.01)

(52) U.S. Cl.
CPC ... *B32B 2307/554* (2013.01); *B32B 2307/732* (2013.01); *B32B 2471/00* (2013.01)

(56) References Cited

U.S. PATENT DOCUMENTS

| | | | | |
|---|---|---|---|---|
| 2013/0273244 | A1* | 10/2013 | Vetter | E04B 1/00 427/201 |
| 2014/0227475 | A1* | 8/2014 | Yu | E04F 15/107 428/86 |
| 2015/0121793 | A1* | 5/2015 | Segaert | E04F 15/02038 52/506.01 |
| 2015/0337540 | A1* | 11/2015 | Cappelle | B32B 3/06 52/309.1 |
| 2016/0083965 | A1* | 3/2016 | Baert | E04F 15/02188 52/309.15 |
| 2016/0168865 | A1* | 6/2016 | Pervan | B32B 5/14 52/309.1 |
| 2016/0194885 | A1* | 7/2016 | Whispell | B32B 5/245 52/309.4 |
| 2017/0044778 | A1* | 2/2017 | Brickner | E04F 15/107 |
| 2017/0284105 | A1 | 10/2017 | Ceysson et al. | |

FOREIGN PATENT DOCUMENTS

| | | |
|---|---|---|
| EP | 3020885 | 5/2016 |
| GB | 2256023 | 11/1992 |
| WO | 2007/109100 | 9/2007 |
| WO | 2012/004701 | 1/2012 |
| WO | 2014/181031 | 11/2014 |
| WO | 2017/027155 | 2/2017 |

\* cited by examiner

RIGID PANEL FOR MAKING A FLOOR COVERING

TECHNICAL FIELD

The present disclosure relates to the technical sector of floor coverings, and more particularly a floor panel for producing a floor covering or the like. The panel according to the disclosure is in the form of a tile or plank, is made from a plastic such as polyvinyl chloride (PVC) and has good mechanical properties.

PRIOR ART

It is well known to produce floor coverings from modular elements in the form of planks or tiles. These modular elements can be glued on the floor or placed freely, in particular when they have male-female assembly means. Such male-female panel connecting or assembly means are in particular described in documents GB 2,256,023, EP 1,026,341, WO 2012/004701, EP 2,843,153 or WO 2016/030627.

Floor coverings are in particular known in the form of planks and tiles made from several layers of plasticized PVC, the latter being particularly advantageous because they are easier to transport than rolls of PVC floor coverings. They are also quick and easy to place. They are thus often used in renovations to cover existing floors.

However, this type of covering generally has poor resistance to indentation, scratching and scraping.

Furthermore, this type of covering does not perform well in terms of dimensional stability according to the criteria contained in standard NF EN ISO 23999 dated April 2012. Indeed, when this type of covering is subject to major temperature variations, in particular when it is placed behind picture windows, shrinkage or expansion phenomena may be observed. These phenomena cause defects to appear, such as doming (the panels curve and locally unstick from the floor, forming a hump), disconnection of the assembly means, or the appearance of play between two adjacent panels.

To resolve this drawback, one solution may consist of systematically gluing this type of covering, even if it comprises assembly means, in zones subject to significant temperature variations. However, this method is tedious, since it increases the placement time and technicality. Additionally, it forces the user to respect a room temperature of about 20° C. during placement.

SUMMARY

One aim of the disclosure is therefore to propose a floor panel made from PVC for producing a floor covering or the like having very good performance in terms of resistance to indentation, abrasion and scraping while retaining, or even improving dimensional stability.

Another aim is to propose a floor panel withstanding a passage of at least 25,000 cycles of a double band castor chair as defined in standard ISO 4918 or NF EN 425.

Another aim is to propose a floor panel classified P4 or even P4S according to the U.P.E.C. classification. Another aim is in particular to propose a floor panel having an indentation value less than or equal to 0.20 mm, preferably less than or equal to 0.15 mm between two static residual indentation measurements done according to standard NF EN 433. Another aim is to propose a floor panel having scraping values according to level r1 or even r2 defined according to the method for "determining the scraping resistance_Test Mr.bis" described in e-Notebook no. 3562 by the Centre Scientifique et Technique du Batiment dated March 2007. This test consists of looking for the stress to be applied on a truncated steel nail with a 3 mm diameter, after which there is an irreversible penetration (critical stress), and the stress beyond which the covering is perforated (maximum stress). Level r1 is obtained if the maximum stress is greater than or equal to 7 $N/mm^2$. Level r2 is obtained if the critical stress is greater than or equal to 30 $N/mm^2$ and if the maximum stress is greater than or equal to 1.5 times the critical stress, which corresponds to a maximum stress greater than or equal to 45 $N/mm^2$.

To that end, a multilayer panel for producing a floor covering is proposed, said panel comprising a wear layer bonded to a back layer, said back layer being made up of at least a thermoplastic material, a plasticizer and fillers, the wear layer comprising a surface layer made up at least of PVC, said surface layer having a Shore D hardness greater than or equal to 60 and a Young's modulus greater than or equal to 1000 MPa.

The wear layer according to the disclosure comprises a surface layer having a Shore D hardness greater than or equal to 60 and a Young's modulus greater than or equal to 1000 MPa. This rigid surface layer is arranged in the upper part of the wear layer, such that the upper face of the surface layer can be in contact with the user. This surface layer is therefore directly exposed to the wear due to traffic, with the exception of cases where this surface layer is covered with a varnish. Without limitation, the surface layer according to the disclosure may be grained and/or covered with a surface varnish, in particular in order to make it easier to maintain.

Integrating a surface layer having a Shore D hardness greater than or equal to 60 and a Young's modulus greater than or equal to 1000 MPa made up of at least PVC in the wear layer of a multilayer panel makes it possible to improve the properties of resistance to indentation, abrasion and scraping of the panel while retaining or even improving the dimensional stability of the panel. The dimensional stability of the panel is improved because the surface layer is rigid and makes it possible to counterbalance the expansion and shrinkage effects of the back layer during major temperature variations, in particular between 0° C. and 50° C. The term rigid means, in the case of the surface layer, that the latter has a Shore D hardness greater than or equal to 60, preferably greater than or equal to 70, and a Young's modulus greater than or equal to 1000 MPa, preferably greater than or equal to 1500 MPa.

Advantageously, the surface layer has a Shore D hardness greater than or equal to 70. A Shore D hardness greater than or equal to 70 essentially makes it possible to improve the resistance to indentation, abrasion and scraping, the layer being more rigid on the surface.

Advantageously, the surface layer has a Young's modulus greater than or equal to 1500 MPa. A Young's modulus greater than or equal to 1500 MPa essentially makes it possible to improve the resistance to indentation, abrasion and scraping and the dimensional stability of the multilayer panel, the panel being more rigid as a whole.

Advantageously, the surface layer is transparent. The surface layer may be transparent or translucent, such that a decorative layer bonded on the back of the surface layer may be visible through the surface layer. In the case of a transparent or translucent surface layer, the decoration may be provided by a decorative layer comprised in the wear layer, and bonded on the back of the surface layer. The decorative layer may in particular consist of a decorative film that may be obtained from a PVC film printed on one of its surfaces. Known printing techniques are in particular rotogravure. The decorative layer may also be printed directly on the back of the surface layer. The decorative layer may also be obtained from pellets made of PVC, then pressed, by plastisol coating, by flat die extrusion, calendering or any other technique well known by those skilled in the art.

The decorative layer may alternatively be obtained by making a printing complex comprising a glass web coated with a PVC plastisol set on both of its faces. The face intended to be bonded across from the surface layer is then printed, for example by rotogravure. The glass web improves the dimensional stability of the floor covering and increases the tear resistance relative to a traditional printed film. The perforation resistance is also improved compared to a printed film. Such a printing complex generally has a thickness between 0.5 and 1 mm and a surface density between 700 and 1200 g/mm$^2$.

The surface layer may in particular be made translucent by incorporating pigments or fillers into its composition, in a small enough quantity to allow the observation of a decoration arranged on the back side of said layer.

The surface layer may also be made opaque in order to give a decorative function to the panel. In this case, the composition of the surface layer comprises pigments and/or fillers in a large enough quantity to make it opaque. Known techniques for obtaining a decoration in the thickness of a surface layer in particular consist of pressing pellets made from PVC colored different shades distributed statistically, in order to obtain non-directional "variegated" decorations. These decorative layers may also be produced by calendaring or extrusion of a set "dry blend", in particular in order to obtain directional or unified "variegated" decorations. Fillers are in particular inorganic fillers, for example clays, silica, kaolin, talc, and calcium carbonate.

Advantageously, the surface layer comprises between 0% and 90% of fillers by weight of the layer, advantageously between 10% and 60% by weight of the layer.

Advantageously, the surface layer comprises impact absorbers. Incorporating impact absorbers makes it possible to make the surface layer less brittle, in particular at low temperatures, based on the considered applications for the panel according to the disclosure.

Incorporating impact absorbers in particular makes it possible to make a rigid layer less brittle at temperatures below 20° C., or even below 10° C., which is not common in a residence, but may cause breaks when placing the covering, or during transport and storage operations in non-temperature-controlled zones.

Advantageously, the impact absorbers that may be used are elastomeric polymeric particles. These elastomeric polymeric particles are called "core-shell particles" and are well known by those skilled in the art. They are formed by a "hard" thermoplastic shell, preferably with an acrylate polymer base, for example polymethyl methacrylate (PMMA), and an elastomeric core generally with a butadiene base, often co-polymerized with styrene, or with an acrylic base.

Advantageously, the surface layer comprises elastomeric polymeric particles.

To obtain an elastomeric core, examples in particular include acrylonitrile-butadiene-styrene (ABS) polymers, acrylonitrile styrene acrylate (ASA) polymers, methacrylate-butadiene-styrene (MBS) polymers, methacrylate-acrylonitrile-butadiene-styrene (MABS) polymers, ethylene/vinyl acetate (EVA) and ethylene/vinyl acrylate (E/VAC) copolymers, vinyl chloride/vinyl-acrylate/ethylene (E/VAC/VC) grafted terpolymers, chlorinated polyethylene (CPE); polyurethane elastomers (PUR), butadiene/2-vinylpyridine, butadiene/methyl isoproprenyl ketone, butadiene/fumaric ester copolymers and mixtures thereof.

These impact absorbers thus contain a cross-linked or weakly cross-linked elastomeric core, surrounded by a thermoplastic shell, often a polymethyl methacrylate (PMMA) polymer. A weakly cross-linked elastomeric core in particular makes it possible to improve the impact resistance of the obtained surface layer. U.S. Pat. Nos. 3,985,703, 4,304,709, 6,433,091, EP 1,256,615 or U.S. Pat. No. 6,869,497 in particular describe such particles, which are thus well known by those skilled in the art. Core-shell polymers are available from many suppliers.

As examples, it is possible to use, as impact absorbers, the MBS Clearstrength C301, C303H, C223, C350, C351, E920 or C859 particles from Arkema, MBS C301 and C303H being preferred. The Durastrength D300 or D340 particles from Arkema, which have an acrylic core surrounded by a PMMA envelope, can also be used. Likewise, it is also possible to use the MBS developed by Rohm and Haas, in particular the Paraloid™ BTA 753, Advastab, or Advalube, the styrene/maleic anhydride copolymers modified by a rubber such as the polymers from the Elix 300 series marketed by Monsanto. Other impact absorbers such as the Hytrel 3495 marketed by DuPont, or CPE marketed under the Tyrin brand by DuPont, as well as the line called Kane Ace MX marketed by Kaneka can also be used.

Advantageously, the impact absorbers are polymeric plasticizers. Polymeric plasticizers that can also be used according to the disclosure are the copolymers and terpolymers from the Elvaloy and Elvaloy HP series marketed by Dupont, the thermoplastic polyurethane (TPU) particles in particular marketed by BASF under the Elastollan line, or by Lanxess under the Baymod line. These TPUs can be aromatic, more preferably aliphatic, formed from polyether polyols, or more preferably formed from polyester polyols, formed from caprolactone derivatives or formed from thermoplastic copolyesters.

Advantageously, the surface layer comprises polymeric plasticizers.

The different impact absorbers listed can be used alone or in a mixture.

Preferably and in order to obtain a transparent surface layer, the impact absorbers are chosen based on their index of refraction so that their incorporation does not modify the index of refraction of the obtained composition compared to the index of refraction of the PVC alone. The index of refraction of the incorporated impact absorbers is in particular comprised between 1.52 and 1.55 at 20° C.

Preferably, the proportion of impact absorbers by weight of the surface layer is less than 25%, preferably comprised between 2.5% and 15% by weight of the surface layer. The quantity of impact absorbers by weight of the layer depends on the grade of impact absorbers used, and in particular the chain length of the longest of the polymers forming the impact absorber. This quantity may easily be adapted by one skilled in the art based on the glass transition temperature of the composition of the obtained surface layer.

According to one particular embodiment of the disclosure, the composition of the surface layer has a glass transition temperature (Tg) between 60° C. and 80° C., preferably between 70° C. and 80° C. This glass transition temperature above the temperature generally observed in a room likely to receive the public makes it possible to guarantee that the surface layer will not soften much under normal usage conditions, which will guarantee the dimensional stability of the entire panel according to the disclosure.

Advantageously, the surface layer may be obtained from a composition comprising at least one liquid, non-polymeric plasticizer, the proportion of liquid plasticizer by weight of the surface layer being less than 10%, preferably less than or equal to 5%. A proportion of liquid plasticizer of less than 10% will increase the rigidity of the multilayer panel while making it possible for this surface layer to be produced using traditional calendaring or extrusion methods. A proportion of liquid plasticizer of less than or equal to 5% further increases the rigidity of the multilayer panel as well as the resistance to indentation, abrasion and scraping and the dimensional stability of the panel.

Incorporating a quantity of liquid plasticizer of less than 10% by weight of the surface layer allows the rigid surface layer to be easier to transform and less brittle while retaining good dimensional stability properties. The presence of a low liquid plasticizer level, or less than 10% by weight of the surface layer, also facilitates the implementation of the PVC at a temperature of less than or equal to 180° C., thus limiting the risks of degradation of the material. This property is particularly advantageous in the methods for manufacturing a surface layer by calendaring. Incorporating a quantity of liquid plasticizer of less than 5%, more preferably between 1 and 5% by weight of the surface layer, makes it possible to obtain a better compromise between the dimensional stability, abrasion resistance and scratch resistance properties.

According to one particular embodiment of the disclosure, the molecular weight of the PVC used to produce the surface layer, traditionally linked to the value K or "K-value", the definition of which is well known by those skilled in the art, is comprised between 50 and 85, preferably 50 and 75, and very preferably 50 and 64. This in particular makes it possible to guarantee that the composition of the rigid PVC layer can be transformed using methods such as calendaring or continuous pressing, at a temperature below or equal to 180° C.

Preferably, the surface layer has a thickness of between 0.1 and 3 mm, preferably between 0.3 and 2.5 mm, more preferably between 0.5 and 2 mm. The thickness of the surface layer may be determined as a function of the desired use for the panel according to the disclosure. A surface layer whose thickness is comprised between 0.1 mm and 1 mm in particular corresponds to the traditional thickness of surface layers of LVT (Luxury Vinyl Tile) panels.

Preferably, the surface layer has a thickness of between 5% and 30% of the total thickness of the panel. The greater the thickness of the surface layer is relative to the total thickness of the panel, the more stable the dimensions of the obtained panel will be as a function of temperature. A minimal thickness of the surface layer will slightly improve the dimensional stability of the panel and will make it possible to obtain a good scratch resistance. By increasing the thickness of the surface layer, within the limit of 30% of the total thickness of the panel, the dimensional stability and the indentation resistance of the panel will be optimized.

According to the disclosure, the back layer may be compact, or foam. It may be obtained using any method well known by those skilled in the art, in particular by calendaring, pressing, extrusion or coating. It may be obtained from plasticized PVC. In general and in a manner well known by those skilled in the art, a back layer may be obtained from a composition comprising a thermoplastic material such as a thermoplastic polymer, for example PVC, a plasticizer, fillers and optionally stabilizers, lubricants, additives and pigments. Alternatively, the thermoplastic polymer may be replaced in whole or in part by rubber, either natural or synthetic, linoleum or polyester.

In general, a back layer and a layer of plasticized PVC may be obtained with a composition comprising about 30% PVC, about 10% plasticizers, about 5% additives (process aids, stabilizers, pigments) and about 55% fillers. Preferably, a back layer may be obtained from a first back layer and a second back layer bonded to one another via a reinforcement such as a glass web. As an example, the first back layer comprises about 33% PVC, 10% plasticizers (DINP), 4% additives (process aids, stabilizers, pigments), 3% PVC particles mixed with glass fibers and 50% fillers; the second back layer comprises about 33% PVC, 10% plasticizers (DINP), 4% additives (process aids, stabilizers, pigments) and 53% fillers.

Preferably, and in order to enhance the mechanical performance and indentation and scraping resistance and to further improve the dimensional stability of the panel over time, the back layer comprises a reinforcement. A reinforcement may be obtained from a woven or non-woven textile, or from a glass grid and/or a web, a glass grid and a web being able to be complexed. By incorporating a surface layer made from rigid PVC into the panel, and depending on the thickness of said surface layer relative to the total thickness of the panel, it is possible that the difference in rigidity between the surface layer and the rest of the layers of the panel may cause doming or curling phenomena, i.e., a curvature of the panel in one direction or the other. This phenomenon appears in response to poor balancing of the mechanical stresses between the layers of the panel. The addition of one or several reinforcements in the back layer makes it possible to stiffen the back layer and thus balance the panel as a whole.

A reinforcement has for example the form of a grid or quadrille of textile yarns of negligible thickness. The textile yarns of said reinforcement are for example obtained from glass fibers, and are preferably, separated from each other by 3 mm along the longitudinal and transverse dimensions and have a linear mass density included between 20 g/m and 70 g/m, advantageously between 35 g/m and 50 g/m. A reinforcement may also consist of a web of glass fibers or polyester fibers with a surface density comprised between 40 g/m$^2$ and 100 g/m$^2$.

Alternatively or additionally, in order to increase the mechanical performance, increase the resistance to indentation and scraping, and further improve the dimensional stability of the panel, the back layer may comprise a balancing layer, made up at least of PVC. A balancing layer in particular makes it possible to balance the tensions in the multilayer panel created by the surface layer according to the disclosure. Advantageously, the balancing layer is a layer for balancing tensions in the multilayer panel created by the surface layer according to the disclosure. The balancing layer is obtained using any means described for obtaining the surface layer according to the disclosure.

Advantageously, the balancing layer has a Shore D hardness greater than or equal to 50, advantageously greater than or equal to 60, preferably greater than or equal to 70, and a Young's modulus greater than or equal to 500 MPa, advantageously greater than or equal to 1000 MPa, preferably greater than or equal to 1500 MPa. The balancing layer is thus rigid enough, or as rigid as the surface layer, in order to increase the rigidity of the panel. The rigidity of the balancing layer may be adapted based on the differences in thickness of the surface and balancing layers and their compositions.

A balancing layer made up at least of PVC may in particular be obtained from a composition comprising a proportion of liquid plasticizer of less than 15% by weight of the layer, preferably less than or equal to 10% by weight of the layer, more preferably less than or equal to 5% by weight of the layer.

Advantageously, the composition of the balancing layer comprises impact absorbers as previously defined, preferably elastomeric polymeric particles. Preferably, the proportion of impact absorbers in the composition of the balancing layer is less than 25% by weight of the balancing layer, preferably between 2.5% and 15% by weight of the balancing layer. The quantity of impact absorbers by weight of the layer depends on the grade of impact absorbers used, and in particular the chain length of the longest of the polymers forming the impact absorber. This quantity may easily be adapted by one skilled in the art based on the glass transition temperature of the composition of the obtained balancing layer.

According to one particular embodiment of the disclosure, the composition of the balancing layer has a glass transition temperature (Tg) between 60 and 80° C., preferably between 70 and 80° C. This glass transition temperature above the temperature generally observed in a room likely to receive the public makes it possible to guarantee that the balancing layer will not soften much under normal usage conditions, which will guarantee the dimensional stability of the entire panel according to the disclosure.

Preferably, the back layer is a balancing layer made up at least of PVC.

A balancing layer made up at least of PVC makes it possible to decrease the difference in rigidity between the surface layer and the rest of the layers of the panel and thus prevents the appearance of curving phenomena of the panel. The more the Shore hardness is over 50 and the Young's modulus is over 500 MPa, the more the rigidity of the obtained panel, and therefore its dimensional stability, are increased. The addition of one or several balancing layer(s) made from PVC in the back layer thus makes it possible to stiffen the back layer, and thus to balance the panel as a whole. This balancing layer may be arranged in the lower part of the back layer, such that a face of the balancing layer is in contact with the floor. Alternatively, this balancing layer may be arranged in the central part of the back layer so as to balance the structure of the product and/or to replace a reinforcement.

Alternatively, this balancing layer may be arranged in the upper part of the back layer in contact with the wear layer. Advantageously, the balancing layer is bonded to the wear layer. In the case where said balancing layer is bonded to the wear layer, the resistance to indentation, scratching and scraping is improved. This embodiment is in particular interesting to decrease the thickness of the surface layer, which generally contains little filler and is therefore more expensive to produce. Decreasing the thickness of the surface layer limits the mechanical performance; adding a balancing layer bonded to the wear layer therefore makes it possible to compensate this decrease and obtain equivalent resistance to indentation, scratching and scraping. This is particularly interesting in the case where the floor covering comprises a decorative film, sandwiched between a rigid surface layer made up at least of PVC and a balancing layer made up at least of PVC. Advantageously, the wear layer comprises a decorative film, said decorative film being in contact with the balancing layer.

Preferably and in order to obtain a balanced back layer as such, a first balancing layer made up at least of PVC is arranged in the upper part of the back layer and a second balancing layer made from PVC is arranged in the lower part of the back layer.

In general and in a manner well known by those skilled in the art, the surface layer according to the disclosure and/or the back layer according to the disclosure and/or each of the component layers of the surface or back layer may be obtained by dry blend calendaring, by pressing formulated pellets (compounds) or dry blend pellets, or by extrusion.

Fillers that may be used are in particular inorganic fillers, for example clays, silica, kaolin, talc, calcium carbonate.

Advantageously, the balancing layer comprises between 0% and 90% fillers by weight of the layer, advantageously between 10% and 60% by weight of the layer.

The non-polymeric liquid plasticizers that may be used in each of the layers of the floor covering according to the disclosure are in particular plasticizers such as Diisononyl Phthalate (DINP), Diisodecyl Phthalate (DIDP), 2-Ethylhexyl Diphenyl Phosphate (DPO), Dioctylic terephthalate (DOTP), 1,2-Cyclohexane dicarboxylic acid diisononyl ester (DINCH), plasticizers from the benzoate family, plasticizers from the adipate family, plasticizers marketed under the PEVALEN® brand by Perstorp, epoxidized soybean oil (ESBO), epoxy octyl stearate (EOS), entirely or partially biosourced plasticizers, for instance plasticizers from the Polysorb® ID 37 line marketed by Roquette Pharma, plasticizers from the citrofol line marketed by Jungbunzlauer International AG, or plasticizers from the soft-n-safe line marketed by Danisco. The liquid plasticizers can be used alone or in a mixture.

The panels according to the disclosure assume the form of planks or tiles, each panel comprising an upper face intended to be in contact with the user, a lower face intended to be in contact with the floor and four edges. The edges of the panels according to the disclosure can be machined to have male-female assembly means, making it possible to connect several panels to one another. Male-female assembly means in particular refer to means comprising a slot machined on one of the edges of a panel and configured to be assembled with a tab machined on the opposite edge of an adjacent panel. Male-female assembly means assembled perpendicular to the floor and using machining profiles in the form of dovetails are also considered. In general, the male-female assembly means comprise a first machining profile machined on one edge of a panel and configured to be assembled to a second machining profile machined on an opposite edge of an adjacent panel. The panels thus obtained generally have two pairs of machining profiles, each pair comprising a first and second machining profile on two opposite edges of a panel. The first and second machining profiles of each pair are not necessarily similar, in particular depending on the length of the considered edge and the desired assembly direction. The assembly of the panels may in particular be done in a direction perpendicular to the floor in the case of so-called "vertical" assembly means, in a direction parallel to the floor in the case of so-called "horizontal" assembly means, or in more complex directions, for example by rotation and/or translation of a male assembly means in a female assembly means. Such assembly means are in particular described in documents GB 2,256,023, EP 1,026,341, WO 2012/004701 or WO 2016/030627. Preferably, once assembled, the assembly means block the movement of two panels at once in a vertical direction, i.e., perpendicular to the floor, and in a direction that is perpendicular to the edge of the panel on which the considered assembly means is machined and parallel to the plane formed by the floor. The assembly means and their machining profiles may in particular be obtained by in-line machining, injection molding of the panel or by cutting, in particular by hollow punch.

The panels according to the disclosure have a thickness generally between 2.5 mm and 10 mm, preferably between 4 mm and 6 mm. This thickness is measured between the upper face of the surface layer intended to be in contact with the user and the lower face of the back layer intended to be in contact with the floor. The panels according to the disclosure have a width between 8 cm and 70 cm, preferably between 15 cm and 25 cm, and a length between 50 cm and 240 cm, preferably between 10 cm and 150 cm.

BRIEF DESCRIPTION OF THE FIGURES

Other features and advantages will emerge better from the following description, provided as a non-limiting example, in reference to the appended figures, in which.

DETAILED DESCRIPTION

Figure 1:
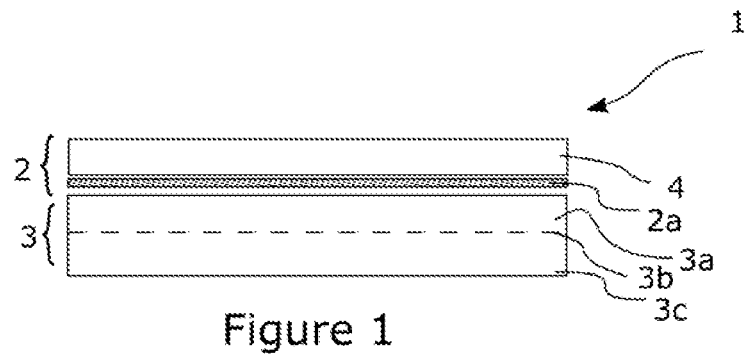
FIG. 1 schematically illustrates a sectional view of a floor covering according to the disclosure, the wear layer of which comprises at least one rigid surface layer.

In reference to FIG. 1, the floor covering (1) according to the disclosure comprises:
 a wear layer (2), comprising a rigid surface layer (4) having a Shore D hardness greater than or equal to 60 and a Young's modulus greater than or equal to 1000 MPa and a decorative layer (2a);
 a back layer (3).

The decorative layer (2a) may in particular consist of a decorative film that may be obtained from a PVC film printed on one of said faces. Known printing techniques are in particular rotogravure. Alternatively, the decorative layer (2a) may also be obtained from pellets made from PVC, then pressed, by plastisol coating, by flat die extrusion or by calendaring.

In general, a back layer (3) traditionally made from plasticized flexible PVC may be obtained with a composition comprising about 30% by weight of PVC, about 10% by weight of plasticizers, about 5% by weight of additives (process aids, stabilizers, pigments) and about 55% by weight of fillers.

The back layer (3) is for example made up of a first layer made from PVC (3a) intended to be bonded to the wear layer (2), a second layer (3c) and a reinforcement (3b) bonded between the first layer (3a) and the second layer (3c). The layers (3a) and (3c) are for example obtained from filled plasticized PVC and formed by calendaring. The back layer (3) may also be obtained by pressing pellets manufactured from PVC, by coating with plastisol, or by flat die extrusion. Producing this layer by calendaring nevertheless remains its favored manufacturing method in terms of cost and resulting mechanical performance.

Figure 2:
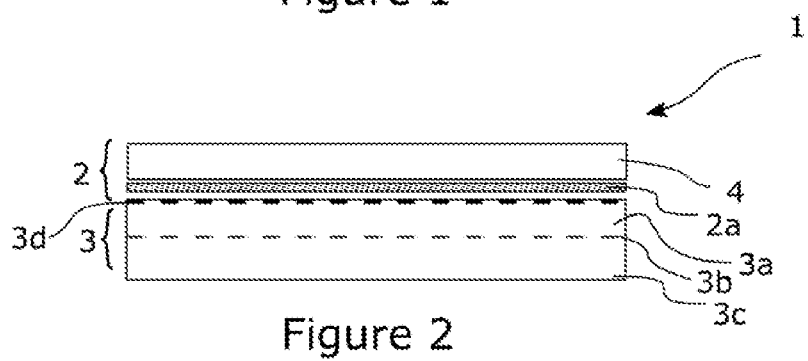
FIG. 2 shows a schematic sectional view of an alternative floor covering according to the disclosure.

Alternatively and in reference to FIG. 2, the floor covering (1) according to the disclosure comprises a first reinforcement (3b) and a second reinforcement (3d), for example in the form of two fiberglass grids.

Figure 3:
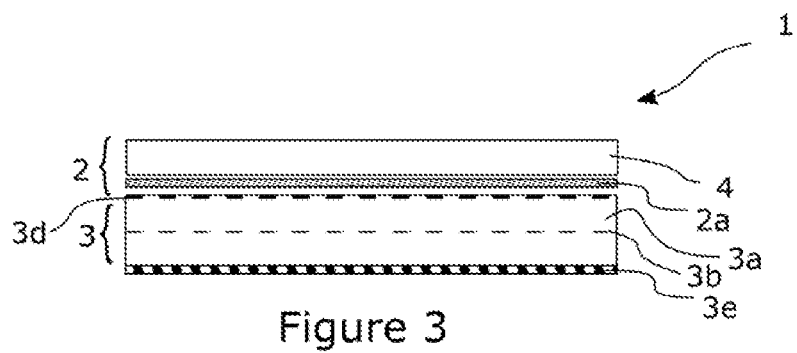
FIG. 3 schematically illustrates a sectional view of an alternative floor covering according to the disclosure, the wear layer of which comprises at least one balancing layer obtained from PVC.
Figure 4:
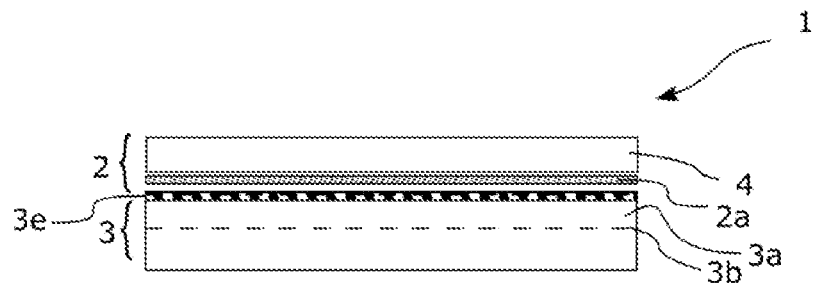
FIG. 4 schematically illustrates a sectional view of an alternative floor covering according to the disclosure, the wear layer of which comprises at least one balancing layer obtained from PVC.
Figure 5:
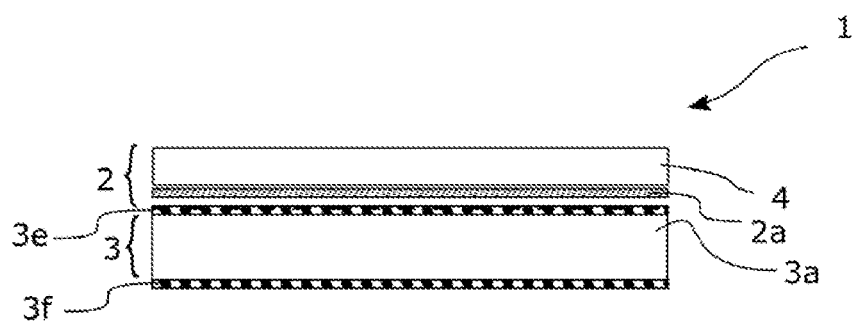
FIG. 5 schematically illustrates a sectional view of an alternative floor covering according to the disclosure, the wear layer of which comprises at least one balancing layer obtained from PVC.

Particularly and in reference to FIGS. 3, 4 and 5, the back layer (3) may comprise at least a first balancing layer (3e) made from PVC. In a first alternative, according to FIG. 3, said balancing layer is arranged in the lower part of the back layer (3), such that one face of the balancing layer (3e) is in contact with the floor.

Alternatively, said balancing layer (3e) can be arranged in the upper part of the back layer (3), as illustrated in FIG. 4, such that a face of the balancing layer (3e) is in contact with the wear layer (2). This position of the balancing layer advantageously makes it possible to eliminate the reinforcement while retaining the good dimensional stability characteristics. This position also makes it possible to decrease the thickness of the rigid surface layer (4) while retaining very good mechanical properties as well as good resistance to indentation, scratching and scraping, while decreasing the manufacturing cost of the floor covering.

Alternatively and in reference to FIG. 5, the back layer (3) may comprise at least a first balancing layer (3e) and a second balancing layer (3f) made from PVC. The balancing layers (3e, 3f) are respectively arranged in the lower and upper part of the back layer (3). The first balancing layer (3e) may in particular be bonded to the wear layer (2). The second balancing layer (3f) may in particular be arranged to be in contact with the floor. This particular configuration in particular makes it possible to obtain a balanced and dimensionally stable back layer (3), without having to add a reinforcement.

With the aim of obtaining a particularly stable back layer (3), the latter may also be made up of a single balancing layer obtained from PVC.

Figure 6:
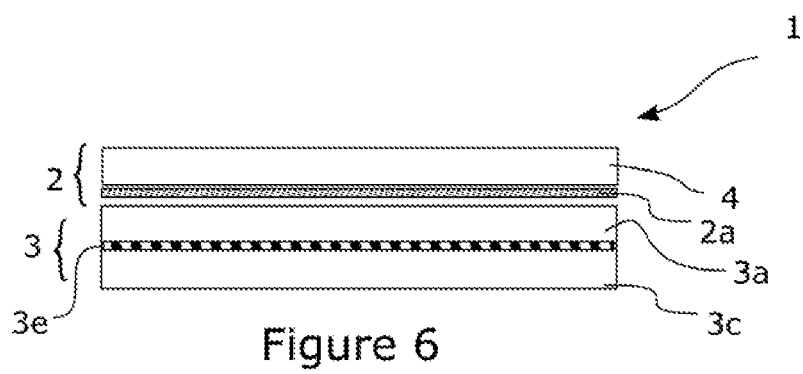
FIG. 6 schematically illustrates a sectional view of an alternative floor covering according to the disclosure, the wear layer of which comprises at least one balancing layer obtained from PVC.

In reference to FIG. 6, the floor covering (1) according to the disclosure may also comprise:
 a wear layer (2), comprising a rigid surface layer obtained from PVC (4) and a decorative layer (2a)
 a back layer (3), comprising a balancing layer (3e) arranged in the central position and obtained from PVC and bonded between a first back layer (3a) and a second back layer (3c) that are traditionally obtained from plasticized and filled flexible PVC.

In this example, the balancing layer (3e) makes it possible to improve the dimensional stability and the scraping of the obtained floor covering without needing to use a reinforcement such as a glass web.

EXAMPLES

Examples 1 to 3

Tiles according to FIG. 2 are manufactured.

These tiles are obtained by static pressing (3 minutes of heating at 180° C. and bars followed by 4 minutes of cooling under 10 bars) of:

A back layer (3), comprising two layers obtained from plasticized and shaded flexible PVC pellets (3a and 3c), said pellets being manufactured beforehand by compounding;

Two reinforcing glass grids (3b and 3d) of about 50 g/m² (68 tex, 200 μm thick) intercalated between the two layers (3a, 3c) and between the back layer (3) and the wear layer (2).

A wear layer (2) comprising a printed decorative PVC film (2a) on which a 2 mm transparent rigid surface layer (4) made from PVC is laminated.

After cooling to ambient temperature, these tiles are covered with a thin layer of acrylate-based varnish (not shown) of about 25 g/m², on a coating line.

The pellets making up the backing sub-layers (3a and 3c) comprise the following ingredients, expressed in percentages by weight: 41% PVC, 16% plasticizer (DINP), 2% additives (process aids, thermal stabilizers, pigments) and 41% calcium carbonate ($CaCO_3$). The characteristics of the backing sub-layers (3b, 3d) are summarized in table 2.

The transparent surface layer (4) is in turn obtained by calendaring a dry blend of a rigid PVC-based formula. Three transparent surface layers are obtained from rigid PVC (CU 1, CU 2, CU 3) according to the disclosure as well as a traditional reference surface layer (CU REF). The compositions of the layers (CU 1, CU 2, CU 3 and CU REF) are given in table 1. The physicochemical characteristics of said layers are also given in detail in table 2.

Four tiles (examples 1 to 3 and reference) are thus produced from each of layers CU 1 to CU 3 and CU REF. These tiles are self-leveling, and are generally placed on the floor without glue, owing to a male-female assembly system in the form of dovetails.

TABLE 1 composition of the tiles

| Type/% by weight | Example 1 | Example 2 | Example 3 | Reference |
|---|---|---|---|---|
| Back layer (3) | Flexible PVC | Flexible PVC | Flexible PVC | Flexible PVC |
| PVC | 41% | 41% | 41% | 41% |
| Liquid plasticizer | DINP/16% | DINP/16% | DINP/16% | DINP/16% |
| Fillers | $CaCO_3$/41% | $CaCO_3$/41% | $CaCO_3$/41% | $CaCO_3$/41% |
| Additives | 2% | 2% | 2% | 2% |
| Surface layer (4) | Rigid PVC (CU1) | Rigid PVC (CU2) | Rigid PVC (CU3) | Flexible PVC (CU REF) |
| PVC/K-wert | 85.4%/K60 | 85.4%/K50 | 85.4%/K60 | 72%/K64 |
| Liquid plasticizers | DINCH + ESO/7.2% | DINCH + ESO/7.2% | DINCH + ESO/7.2% | DINCH + ESO/26.7% |
| Additives** | 1.4% | 1.4% | 1.4% | 1.3% |
| Impact absorbers | Clearstrength W300/5.9% | Clearstrength W300/5.9% | Elvaloy 741/5.9% | None |

The additives in particular comprise lubricants, process aids, thermal stabilizers and any pigments.

TABLE 2

Characteristic properties of the obtained tiles

| | | Example 1 | Example 2 | Example 3 | Reference |
|---|---|---|---|---|---|
| Layer in question | Backing sub-layer (3a and 3c) | CU 1 rigid | CU 2 rigid | CU 3 rigid | CU REF (flexible) |
| Thickness | 4 mm | 2 mm | 2 mm | 2 mm | 2 mm |
| Appearance | Pigmented | Transparent | Transparent | Transparent | Transparent |
| Shore D hardness | (51 ± 1) | (70 ± 4) | (66 ± 1) | (71 ± 1) | (46 ± 1) |
| Tg (tan δ) in ° C. [1] | 39.74 | 77.8 | 74.1 | 67.8 | 47.2 |
| Elasticity modulus (MPa) [2] | 119 | 2429 | 1778 | 1894 | 60 |
| Maximum force (MPa) [2] | 9 | 46 | 36 | 32 | 21 |
| Elongation at break (%) [2] | 70 | 64 | 64 | 155 | 210 |
| Static indentation (standard EN 433)* | Not applicable | 0.02 | 0.03 | 0.05 | 0.13 |
| Average dimensional stability (Standard EN 434)* | Not applicable | 0.09 | 0.15 | 0.09 | 0.06 |

TABLE 2-continued

Characteristic properties of the obtained tiles

| | Example 1 | Example 2 | Example 3 | Reference |
|---|---|---|---|---|
| Scraping resistance (according to CSTB notebook no. 3562): critical stress | Not applicable | +++ (>37 N/mm$^2$) | ++ (>34 N/mm$^2$) | ++ (>31 N/mm$^2$) | (<19 N/mm$^2$) |

(1) Tg determined by rheology on a flat/flat rheometer of the Thermofisher Haake Mars type, equipped with a 25 mm wheel: ramp at 5.2° C./min from 180° C. to 25° C.
(2) Mechanical traction properties determined according to standard ISO 527 on a traction bench of the Shimadzu autograph AGS-X type traction bench, on dumbbell-shaped samples of 58 mm (length between the jaws) × 5 mm (straight width outside attachments zone) × 2 mm thick, at a speed of 10 mm/min.

Regarding the scraping resistance test, the stresses indicated in table 2 correspond to the stresses applied for which the wear layer, and in particular the printed decorative film, were not perforated.

The results demonstrate a very strong improvement of the scraping resistance for the tiles according to the disclosure, examples 1 to 3 all obtaining a resistance greater than 35 N/mm$^2$. This stress value makes it possible to obtain a tile with level r1, or even r2. The static indentation of the tiles according to the disclosure is also greatly reduced owing to the use of a wear layer comprising a layer of rigid PVC according to the disclosure.

Examples 4 and 5

Planks according to FIG. 6, corresponding to the construction of LVT ("Luxury Vinyl Tiles") planks, were manufactured according to table 3, by static pressing (3 minutes of heating at 165° C. and 10 bars followed by 4 minutes of cooling under 10 bars).

The planks comprise a back layer (3):
  made entirely from plasticized flexible PVC for the reference plank (REF 2);
  made from a stack of a balancing layer made from filled rigid PVC (3e) bonded between two inner layers of flexible PVC (3a, 3c);

a wear layer (2) comprising a printed decorative PVC film (2a) on which a 0.5 mm transparent surface layer (4) is laminated, made from flexible PVC (reference example 4), or rigid PVC (example 5). The wear layers of example 4 and reference example 2 copy the composition of the reference wear layer CU REF of the preceding table 2.

The layers made from flexible PVC (3a, 3c) comprise the following ingredients, expressed in percentages by weight: 29% PVC, 9% plasticizers (DINP), 8% additives (process aids, thermal stabilizers, pigments) and 54% calcium carbonate (CaCO$_3$).

The rigid PVC balancing layer (3e) comprises the following ingredients, expressed in percentages by weight: 50% PVC, 4.5% plasticizers, 0.5% additives (process aids, thermal stabilizers, pigments), 3.5% impact absorbers and 41.5% calcium carbonate (CaCO$_3$).

The physicochemical characteristics of the layers (3e) and (3a, 3c) thus obtained are summarized in table 4.

The transparent surface layer (4) is in turn obtained by calendaring a dry blend of a formula with a flexible PVC or rigid PVC base.

The obtained planks are self-weighting, and are therefore generally placed on the floor without glue, owing to a male-female assembly system in the form of clicks, like that described in patent application WO 2016/030627 by the applicant.

TABLE 3 composition of the LVT planks

| Type/% by weight | Example 4 | | | Example 5 | Reference 2 |
|---|---|---|---|---|---|
| | Flexible layer 3a, bonded to the balancing layer 3e bonded to the flexible layer 3c | | | | |
| Back layer (3) | Flexible layer (3a) | Balancing layer (3e) | Flexible layer (3c) | | Flexible PVC |
| PVC | 29% | 50% | 29% | | 29% |
| Plasticizer | DINP; 9% | DINCH + ESO 4.2% | DINP; 9% | | DINP/9% |
| Fillers | CaCO$_3$; 54% | CaCO$_3$; 41.5% | CaCO$_3$; 54% | | CaCO$_3$/54% |
| Additives | 0.5% | 0.8% | 0.5% | | 8% |
| Impact absorbers | n/a | Clearstrength W300: 3.5% | n/a | | n/a |
| Thickness | 1.35 mm | 3 mm | 1.35 mm | | 5.7 mm |
| Surface layer (4) | Flexible PVC (CU REF) | | | Rigid PVC (CU5) | Flexible PVC (CU REF) |
| PVC/K-value | 72%/K64 | | | 84%/K50 | 72%/K64 |
| Total plasticizer | DINCH + ESO/26.7% | | | ESO/4.2% | DINCH + ESO/26.7% |

TABLE 3-continued composition of the LVT planks

| Type/% by weight | Example 4 | Example 5 | Reference 2 |
|---|---|---|---|
| Other additives | 1.3% | 1.3% | 1.3% |
| Impact absorbers | None | Clearstrength W300/11.7% | None | n/a: Not applicable

The additives in particular comprise lubricants, process aids, thermal stabilizers and any pigments.

The properties of the various layers making up the obtained planks are summarized in table 4.

TABLE 4

Characteristic properties of the manufactured LVT layers

| Layer in question | flexible layer (3a or 3c) | balancing layer (3e) | rigid (CU5) |
|---|---|---|---|
| Shore D hardness | (66 ± 1) | (79 ± 1) | (78 ± 1) |
| Tg (tan δ) in ° C.[(1)] | 54.05 | 74.2 | 74.8 |
| Elasticity modulus (MPa)[(2)] | 337 | 2001 | 2408 |
| Maximum force (MPa)[(2)] | 6 | 18 | 51 |
| Elongation at break (%)[(2)] | 30 | 4 | 12.4 |

[(1)]Tg determined by rheology on a flat/flat rheometer of the Thermofisher Haake Mars type, equipped with a 25 mm wheel: ramp at 5.2° C./min from 180° C. to 25° C.
[(2)]Mechanical traction properties determined according to standard ISO 527 on a traction bench of the Shimadzu Autograph AGS-X type, on dumbbell-shaped samples of 58 mm (length between the jaws) x 5 mm (straight width outside attachments zone) x 2 mm thick, at a speed of 10 mm/min.

The properties of LVT planks manufactured according to the architecture described in table 3 are indicated in table 5:

TABLE 5

Characteristic properties of manufactured LVT planks:

| | Example 4 | Example 5 | Reference 2 |
|---|---|---|---|
| Static indentation (standard EN 433) | 0.05 | 0.03 | 0.29 |
| Average dimensional stability (Standard EN 434) | 0.12 | 0.08 | 0.11 |
| Scratch resistance* | −/+ | +++ | −/+ |

*Scratch resistance evaluated qualitatively after 10 cycles at 25 rpm, on a linear Taber equipped with a 1 mm tungsten carbide tip.

The results demonstrate that the static indentation of the tiles according to the disclosure is reduced owing to the use of a balancing layer (3e). The use of a wear layer comprising a layer of rigid PVC according to the disclosure in example 5 also makes it possible to improve the scratch resistance greatly.

The invention claimed is:

1. A rigid multilayer panel for making a floor covering comprising, a wear layer bonded to a back layer, wherein the back layer comprises a face configured to be in contact with a floor and being free of glue, wherein the multilayer panel has edges, and the edges of the multilayer panel have male-female assembly means configured to connect several multilayer panels to one another,
wherein the back layer comprises a first back layer made from plasticized and filled flexible PVC, and a balancing layer arranged in an upper part of the back layer, the balancing layer is made up at least of PVC obtained from a composition comprising a proportion of liquid plasticizer of less than 15% by weight of the balancing layer, the balancing layer is bonded to the wear layer, and the balancing layer has a Shore D hardness greater than or equal to 50 and a Young's modulus greater than or equal to 500 MPa,
wherein the wear layer comprises a surface layer derived from at least polyvinyl chloride (PVC), the surface layer having:
a Shore D hardness greater than or equal to 60,
a Young's modulus greater than or equal to 1000 MPa, and
a glass transition temperature (Tg) between 60° C. and 80° C.

2. The panel according to claim 1, wherein the surface layer has a Shore D hardness greater than or equal to 70.

3. The panel according to claim 1, wherein the surface layer has a Young's modulus greater than or equal to 1500 MPa.

4. The panel according to claim 1, wherein the surface layer is transparent.

5. The panel according to claim 1, wherein the surface layer comprises impact absorbers.

6. The panel according to claim 5, wherein the impact absorbers are present in an amount of less than 25%, by weight of the surface layer.

7. The panel according to claim 5, wherein the impact absorbers are present in an amount of between 2.5% and 15%, by weight of the surface layer.

8. The panel according to claim 5, wherein the impact absorbers are elastomeric polymeric particles.

9. The panel according to claim 5, wherein the impact absorbers are polymeric plasticizers.

10. The panel according to claim 1, wherein the surface layer has a glass transition temperature (Tg) between 70° C. and 80° C.

11. The panel according to claim 1, wherein a composition of the surface layer comprises at least one liquid plasticizer present in an amount of less than 10%, by weight of the surface layer.

12. The panel according to claim 11, wherein the liquid plasticizer is present in an amount of less than or equal to 5% by weight of the surface layer.

13. The panel according to claim 1, wherein the surface layer has a thickness of between 0.1 and 3 mm.

14. The panel according to claim 1, wherein the surface layer has a thickness of between 0.3 and 2.5 mm.

15. The panel according to claim 1, wherein the surface layer has a thickness of between 5 and 30% of the total thickness of the panel.

16. The panel according to claim 1, wherein the wear layer comprises a decorative film, the decorative film being in contact with the balancing layer.

17. The panel according to claim 1, wherein the composition of the balancing layer has a glass transition temperature (Tg) between 60° C. and 80° C.

18. The panel according to claim 1, having an indentation value less than or equal to 0.20 mm, between two static residual indentation measurements done according to standard NF EN 433, and having a resistance to perforation of the panel until a maximum stress equal to 7 N/mm$^2$ applied on the panel by a truncated steel nail with a 3 mm diameter.

19. A rigid multilayer panel for making a floor covering comprising, a wear layer bonded to a back layer, wherein the back layer comprises a face configured to be in contact with a floor and being free of glue, wherein the multilayer panel has edges, and the edges of the multilayer panel have male-female assembly means configured to connect several multilayer panels to one another,
  wherein the back layer comprises a first back layer made from plasticized and filled flexible PVC, and a balancing layer arranged in an upper part of the back layer, the balancing layer is made up at least of PVC obtained from a composition comprising a proportion of liquid plasticizer of less than 15% by weight of the balancing layer, the balancing layer is bonded to the wear layer, and the balancing layer has a Shore D hardness greater than or equal to 50 and a Young's modulus greater than or equal to 500 MPa,
  wherein the wear layer comprises a surface layer derived from at least polyvinyl chloride (PVC), the surface layer having:
    a Shore D hardness greater than or equal to 60,
    a Young's modulus greater than or equal to 1000 MPa,
    a glass transition temperature (Tg) between 60° C. and 80° C.,
    a liquid plasticizer present in an amount of less than 10%, by weight of the surface layer.

20. A rigid multilayer panel for making a floor covering comprising, a wear layer bonded to a back layer, wherein the back layer comprises a face configured to be in contact with a floor and being free of glue, wherein the multilayer panel has edges, and the edges of the multilayer panel have male-female assembly means configured to connect several multilayer panels to one another,
  wherein the back layer comprises a first back layer made from plasticized and filled flexible PVC, and a balancing layer arranged in an upper part of the back layer, the balancing layer is made up at least of PVC obtained from a composition comprising a proportion of liquid plasticizer of less than 15% by weight of the balancing layer, the balancing layer is bonded to the wear layer, and the balancing layer has a Shore D hardness greater than or equal to 50 and a Young's modulus greater than or equal to 500 MPa,
  wherein the wear layer comprises a surface layer derived from at least polyvinyl chloride (PVC), the surface layer having:
    a Shore D hardness greater than or equal to 60,
    a Young's modulus greater than or equal to 1000 MPa,
    a glass transition temperature (Tg) between 60° C. and 80° C.,
    a liquid plasticizer present in an amount from 1% to 10%, by weight of the surface layer.

* * * * *